United States Patent [19]

Maeda

[11] Patent Number: 4,691,098

[45] Date of Patent: Sep. 1, 1987

[54] FOCUS CONTROL DEVICE

[75] Inventor: Takanori Maeda, Saitama, Japan

[73] Assignee: Pioneer Electronic Corporation, Tokyo, Japan

[21] Appl. No.: 792,560

[22] Filed: Oct. 29, 1985

[30] Foreign Application Priority Data

Oct. 29, 1984 [JP] Japan ................................ 59-227441

[51] Int. Cl.⁴ .......................... G01J 1/20; G01J 1/24; G11B 7/00; G11B 20/22
[52] U.S. Cl. ................................ 250/201; 250/237 R; 369/45
[58] Field of Search .................. 250/201 DF, 204; 369/44, 45, 46; 358/227

[56] References Cited

U.S. PATENT DOCUMENTS

| | | | |
|---|---|---|---|
| 4,504,938 | 3/1985 | Tajima | 369/46 X |
| 4,525,625 | 6/1985 | Abe | 369/45 X |

FOREIGN PATENT DOCUMENTS 0029151  2/1983  Japan ................................ 369/45

Primary Examiner—Eugene R. LaRoche
Assistant Examiner—David Mis
Attorney, Agent, or Firm—Finnegan, Henderson, Farabow, Garrett and Dunner

[57] ABSTRACT

A focus control device comprises a light source; a recording medium on which light from the light source is focused; an objective lens for focusing light from the light source on the recording medium; a light receiving element for receiving the light reflected from the recording medium; an optical unit disposed in the optical path of the reflected light; and a beam splitter for separating the reflected light from an incident light path to the recording medium. The optical unit comprises absorbing parts adapted to absorb a part of the reflected light and transmitting parts adapted to transmit a part of said reflected light, and the absorbing parts forming a predetermined angle with respect to the optical axis of the reflected light.

8 Claims, 10 Drawing Figures

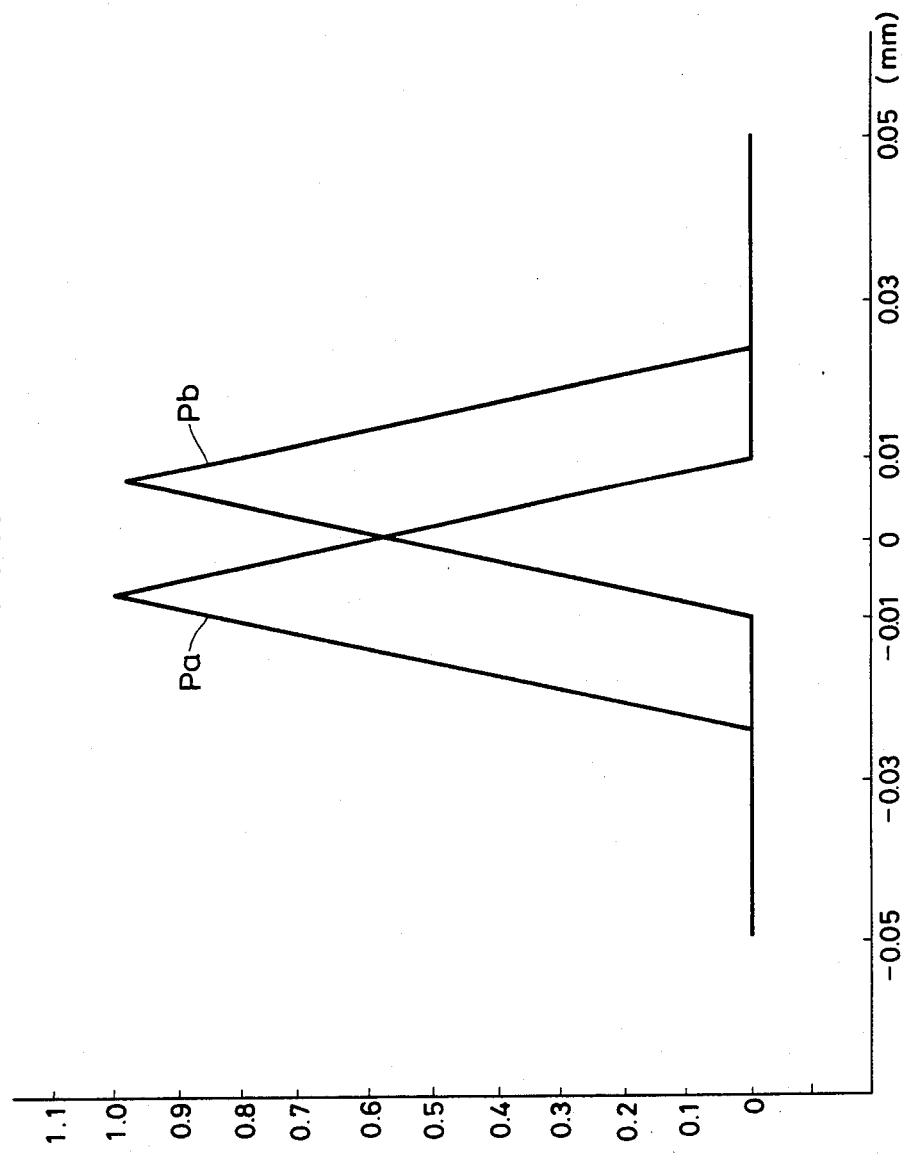

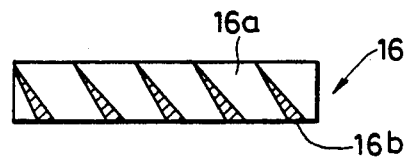
FIG. 6A
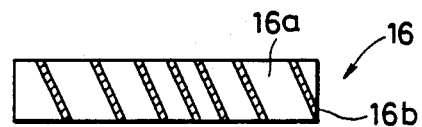
FIG. 6B
FIG. 7
PRIOR ART
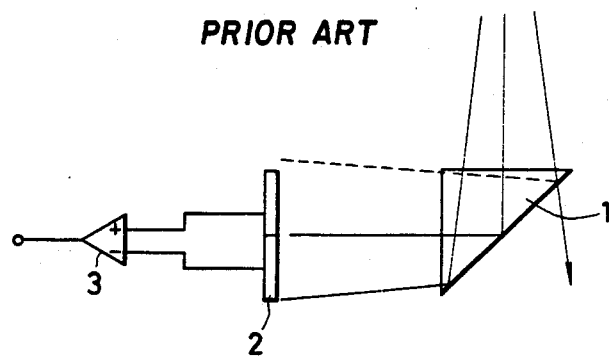

FOCUS CONTROL DEVICE

BACKGROUND OF THE INVENTION

This invention relates to a focus control device which is applicable to a pickup in an optical video disk player or digital audio disk player.

FIG. 7 is an explanatory diagram of a conventional pickup of this type according to a so-called "critical angle method". In FIG. 7, reference numeral 1 designates a critical angle prism; 2, a light receiving element which is divided into two light receiving element units; and 3, a differential amplifier. In the system, when a focusing state is obtained, rays of light incident to the critical angle prism 1 are parallel and reflected at an angle close to the critical angle. Accordingly, when a disk (not shown) is at the focusing position of an objective lens (not shown), the quantities of light applied to the two light receiving element units are equal to each other. However, in the case where the disk and the objective lens are moved towards each other, the light beam on the right side of the optical axis in FIG. 7 is applied to the critical angle prism 1 at an angle smaller than the critical angle; and in the case where the disk and the objective lens are moved away from each other, the light beam on the left side of the optical axis is applied to the critical angle prism 1 at an angle smaller than the critical angle. Therefore, in each of the cases, the light beam passes through the prism 1, and the output of the upper or lower light receiving element unit is smaller, as a result of which the differential amplifier 3 provides an output. The position of the objective lens is controlled according to the output thus provided; that is, the focus controlling operation is carried out.

Focus control devices according to an astigmatism method and a knife edge method are also known in the art.

However, the focus control device according to the critical angle method is disadvantageous in that its manufacturing cost is high and the pickup itself is heavy, because it uses the critical angle prism. The focus control device according to the astigmatism method or knife edge method is also disadvantageous in that it a bulky and intricate in adjustment because it must be operated under the condition that the light beam converges.

SUMMARY OF THE INVENTION

Accordingly, an object of the invention is to overcome the above-noted defects.

According to the invention, a focus control device comprises a light source; a recording medium on which light from the light source is focused; an objective lens for focusing light from the light source on the recording medium; a light receiving element for receiving the light reflected from the recording medium; optical means disposed in the optical path of the reflected light; and a beam splitter for separating said reflected light from an incident light path to the recording medium, the optical means comprising absorbing parts adapted to absorb a part of the reflected light and transmitting parts adapted to transmit a part of the reflected light. and the absorbing parts forming a predetermined angle with respect to the optical axis of the reflected light.

BRIEF DESCRIPTION OF THE DRAWINGS

FIG. 4 is a graphical representation indicating the output characteristic of the light receiving element;

FIGS. 6A and 6B are sectional views showing other examples of the optical means; and FIG. 7 is an explanatory diagram showing an optical system in a conventional focus control device.

DETAILED DESCRIPTON OF THE PREFERRED EMBODIMENTS

Figure 1:
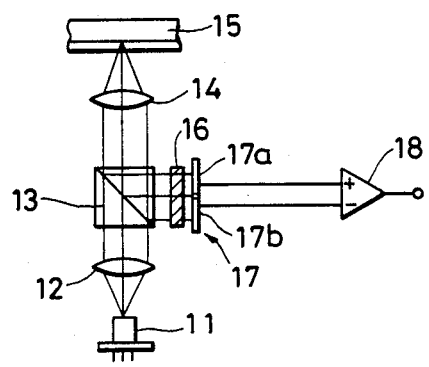
FIG. 1 is an explanatory diagram showing an optical system in a focus control device according to this invention.

FIG. 1 shows a focus control device of the invention which is applied to a pickup. In FIG. 1, reference numeral 11 designates a light source such as a semiconductor laser; 12, a collimator lens for rendering rays of light from the light source 11 parallel; 13, a beam splitter; and 14, an objective lens for focusing light beams on a disk 15. An incident light beam applied from the light source 11 through the collimator lens 12, the beam splitter 13 and the objective lens 14 to the disk 15 becomes a reflected light beam, being reflected by the disk 15. The reflected light beam is separated from the incident light beam and reflected by the beam splitter 13, thus being applied to a light receiving element 17 through optical means 16. The light receiving element 17 is divided into two parts by a straight line perpendicular to the optical axis of the reflected light beam. Each part of light receiving element 17 generates an output signal in accordance with the amount of reflected light impinging thereon. The outputs of the light receiving elements units 17a and 17b are applied to a differential amplifier 18, in which the difference signal between the outputs is produced. The difference signal thus produced is utilized to control the position of the objective lens 14 in the optical axis direction.

Figure 2:
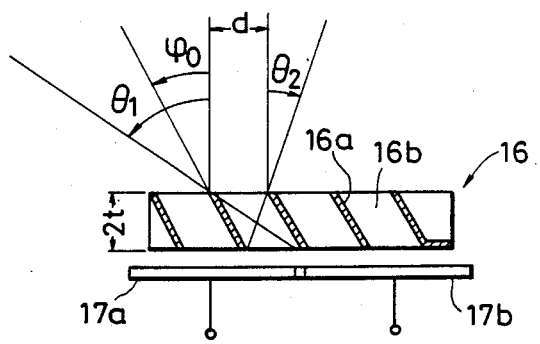
FIG. 2 is a sectional view showing the relationships between optical means and a light receiving element in the optical system.

FIG. 2 shows the relationships between the optical means 16 and the light receiving element 17 in more detail. The optical means 16 comprises absorbing parts 16a which absorb light to prevent the transmission of light, and transmitting parts 16b which transmit light, the absorbing parts 16a and the transmitting parts 16b being arranged alternately. It is not always necessary that the absorbing parts 16a are capable of absorbing light completely; that is, all that is necessary for the absorbing part 16a is to absorb or intercept light to the extent that functions described later are satisfactorily achieved. The transmitting parts 16b may be made of transparent or semi-transparent material or may be hollow. Each absorbing part 16a forms a predermined angle $\phi$ with the optical axis. Each transmitting part 16b defined by adjacent absorbing parts 16a forms substantially a parallelogram in section. One of the diagonals of a respective parallelogram forms an angle $\theta_1$ with the optical axis of the reflected light beam, and the other diagonal forms an angle $\theta_2 (\theta_2 < 0)$.

Figure 3A:
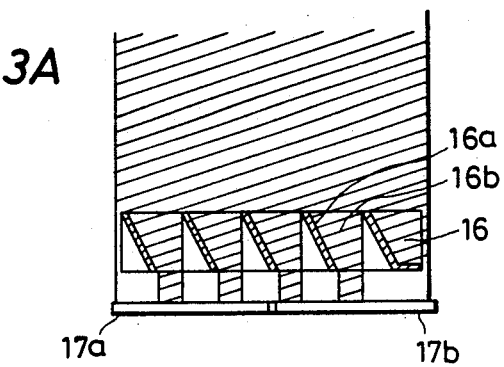
FIGS. 3A to 3C are sectional views showing variations in light reception which are caused when a disk is at the focusing position, and it is displaced from the focusing position.
Figure 3B:
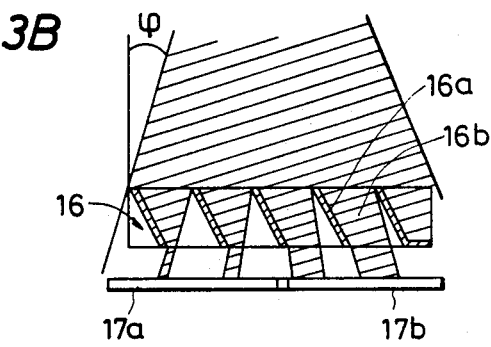
Figure 3C:
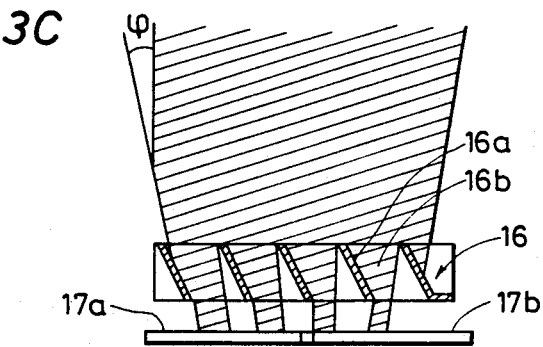

The operation thereof will be described with reference to FIGS. 3A to 3C. It is assumed that adjustment has been so made that, when the disk 15 is at the focusing position of the objective lens 14, parallel rays of light are applied to the optical means 16 as shown in FIG. 3A. When the disk 15 is moved towards the objective lens 14, divergent rays are applied to the optical means 16 as shown in FIG. 3B. When the disk 15 is moved away from the objective lens 14, convergent rays are applied to the optical means 16 as shown in FIG. 3C.

It is assumed that a light beam applied to the optical means 16 forms an angle $\theta$ with the optical axis. In this case, the output Pa of the left light receiving element unit 17a of the light receiving element 17 disposed behind the optical means 16 (FIG. 3) is as follows:

With $\phi < \theta_2$, or $\phi > \theta_1$, $$Pa = 0$$

With $\theta_2 < \phi < \phi_0$, $$Pa1 + 2(\tan\phi - \tan\phi_0)/(\tan\theta_1 - \tan\theta_2)$$

With $\phi_0 < \phi < \theta_1$, $$Pa = 1 - 2(\tan\phi - \tan\phi_0)/(\tan\theta_1 - \tan\theta_2)$$

The reason for this is as follows: If each absorbing part 16a is 2t in thickness and the absorbing parts 16a are arranged at intervals d (or each transmitting part is d in width), then the quantity of light reaching the light receiving element 17 depends on the eclipsing of the absorbing parts 16a on the right or left side of the light receiving element 17. When the incident angle $\phi$ is smaller than the angle $\theta_2$ or larger than the angle $\theta_1$, the quantity of light is zero. When the incident angle $\phi$ is larger than the angle $\theta_2$ and smaller than the angle $\phi_0$, the incident light is eclipsed by the absorbing parts 16a on the right side of the light receiving element 17. Therefore, the quantity of light Pa received is:

$$Pa = (d + 2t\tan\phi_- - 2t\tan\phi)/d$$
$$= 1 + 2t(\tan\phi - \tan\phi_0)/d$$

On the other hand, $$t\tan\theta_1 - t\tan\theta_2 = d$$
$$2(t\tan\theta_1 - t\tan\phi_0) = d$$

Therefore, $$\tan\theta_1 - \tan\theta_2 = d/t = 2\tan\phi_0$$

Accordingly, $$Pa = 1 + 2(\tan\phi - \tan\phi_0)/(\tan\theta_1 - \tan\theta_2)$$

Similarly the output Pb of the right light receiving element unit 17b is as follows: That is, in each of the above-described expressions, $(-\phi_0)$ is employed instead of $(\phi_0)$.

Therefore,

With $\phi < -\theta_1$, or $\phi > -\theta_2$, $$Pb = 0$$

With $-\phi_0 < \phi < -\theta_2$, $$Pb = 1 - 2(\tan\phi + \tan\phi_0)/(\tan\theta_1 - \tan\theta_2)$$

With $-\theta_1 < \phi < -\phi_0$, $$Pb = 1 + 2(\tan\phi + \tan\phi_0)/(\tan\theta_1 - \tan\theta_2)$$

That is, when the disk is at the focusing position shown in the part (a) of FIG. 3, $\phi = 0$, and $$Pa = Pb = 1 - 2\tan\phi_0/(\tan\theta_1 - \tan\theta_2)$$

When the disk 15 is moved towards the objective lens 14 as shown in FIG. 3B, $\phi < 0$, and Pa<Pb with $|\phi| < \phi_0$. When the disk 15 is moved away from the objective lens 14 as shown in FIG. 3C, Pa>Pb. Therefore, a focus error signal can be provided by obtaining the difference between the outputs Pa and Pb through the differential amplifier 18.

Figure 5:
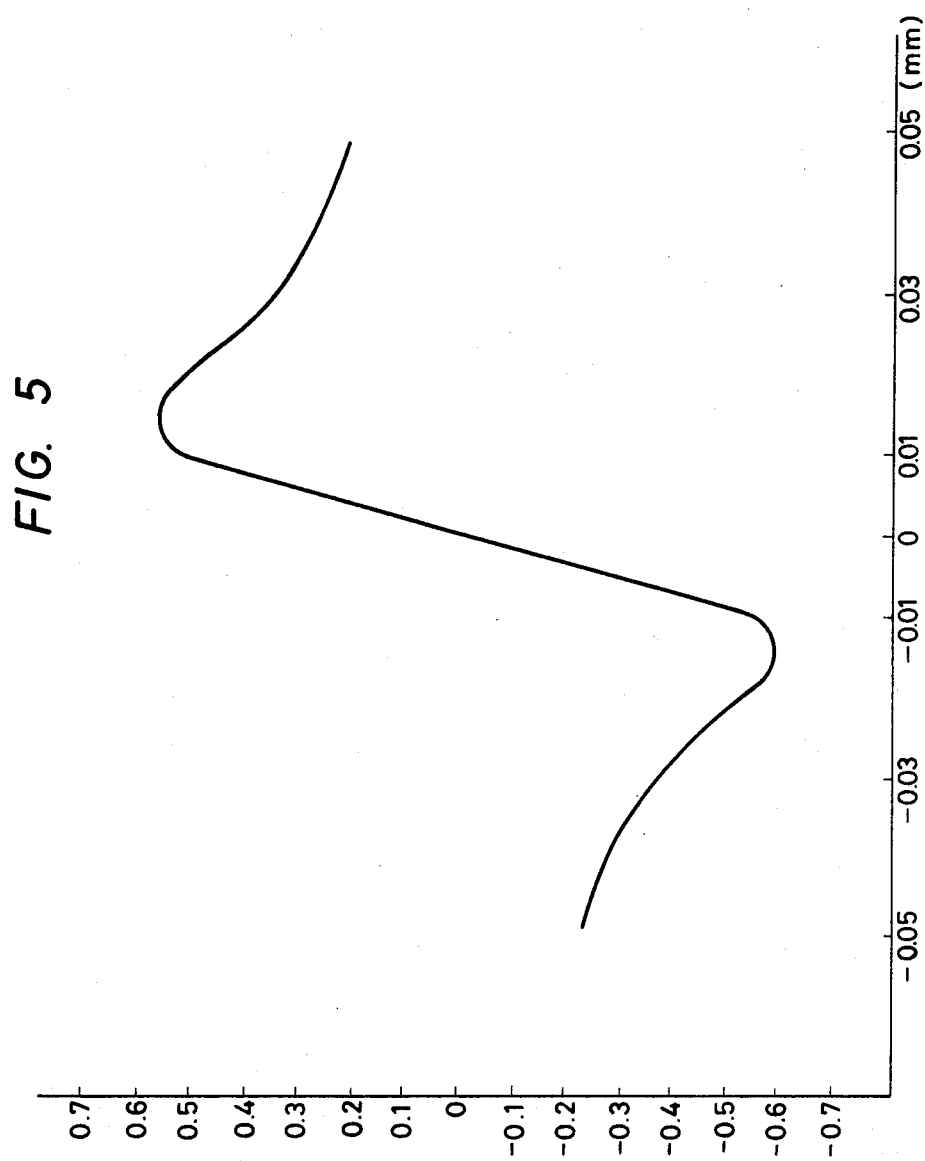
FIG. 5 is also a graphic representation indicating the characteristic curve of an error signal provided by the optical system.

With respect to the above-described expressions, only one angle $\phi$ incident to the light receiving element 17 is taken into consideration, for simplification in description. However, in practice, $\phi = 0$ at the center of the light beam (near the optical axis) and the value of $\phi$ is larger towards the outsides. Accordingly, the variation in the quantity of light which is caused by the absorbing parts 16a depends on the position on the light receiving element 17. If the outputs Pa and Pb with respect to the amount of defocus are obtained through simulation from the above-described expression with the loss of the quantity of light due to displacement from the focusing position taken into consideration in the case where the angle $\phi_0$ is 2.4 minutes and the angle $\theta_1$ is 8.2 minutes, then their characteristic curves are substantially symmetrical as shown in FIG. 4. In the case where 500 absorbing parts 16a are employed, the focus error signal shows a substantially S-shaped characteristic curve as indicated in FIG. 5.

In the above-described embodiment, parallel rays of light are applied to the optical means when the disk is at the focusing position. However, according to the invention, the error output can be obtained according to the angle of the incident light, and therefore the technical concept of the invention can be applied to the case also in which the rays of light applied to the optical means are not parallel when the disk is at the focusing position.

FIG. 6 shows other examples of the optical means 16. In the above-described embodiment, the absorbing parts 16a and the transmitting parts 16b are constant in thickness. However, in the examples, these parts 16a and 16b are not constant in thickness. In the example shown in FIG. 6A, each absorbing part 16a is smaller in thickness towards the light source 11 (or larger in thickness towards the light receiving element 17). In this case, the outputs Pa and Pb change in such a manner as to be constant independently of the incident angle around the angle $\phi_0$, which makes it possible to substantially increase the stable focus control range. In the example shown in FIG. 6B, the pitch of the absorbing parts 16a is made smaller towards the optical axis.

As is apparent from the above-description, in the invention, the focus control is carried out by using the optical means having the absorbing parts and the transmitting parts which are inclined with respect to the optical axis. Therefore, a pickup which is low in manufacturing cost, light in weight, small in size and high in accuracy can be realized according to the invention, and can be adjusted readily.

What is claimed is:

1. A focus control device comprising:
   a light source;
   a movable recording medium on which incident light from said light source is focused and reflected therefrom;
   an objective lens, positioned in the optical path of said incident light between said light source and said recording medium, for focusing incident light from said light source on said recording medium;
   a beam splitter, positioned in the optical paths of said incident light from said light source and said reflected light from said recording medium, for separating said reflected light from said incident light and reflecting said separated light along an optical path;
   a light receiving element for receiving said light reflected from said beam splitter;
   optical means, positioned in said optical path of said reflected light from said beam splitter for selectively absorbing and transmitting said reflected light from said beam splitter;
   said optical means comprising absorbing parts having a selected thickness and adapted to absorb a part of said reflected light from said beam splitter, and transmitting parts adapted to transmit a part of said reflected light from said beam splitter, said absorbing parts forming a predetermined angle with respect to the optical axis of said optical path of said reflected light from said beam splitter such that upon movement of said recording medium relative to said objective lens, varying amounts of reflected light from said beam splitter, indicative of the relative positions of said objective lens and said recording medium, impinge on said light receiving element.

2. A focus control device as claimed in claim 1, wherein said light receiving element is divided into two light receiving element units by a straight line perpendicular to said optical axis of said reflected light from said beam splittr, each of said element units generating an output signal in accordance with the amount of reflected light from said beam splitter impinging thereon, the position of said objective lens being controlled according to a difference between outputs of said light receiving element units to which said reflected light from said beam splitter is applied through said optical means.

3. A focus control device as claimed in claim 1, wherein said absorbing parts and said transmitting parts are disposed alternately in said optical means.

4. A focus control device as claimed in claim 1, wherein said thickness of each absorbing part decreases towards said beam splitter.

5. A focus control device as claimed in claim 2, wherein said thickness of each said absorbing part decreases toward said beam splitter.

6. A focus control device as claimed in claim 3, wherein said thickness of each said absorbing part decreases toward said beam splitter.

7. A focus control device as claimed in claim 3, wherein the spacing between consecutive absorbing parts increases outwardly from said optical axis of said optical path of said light reflected from said beam splitter.

8. A focus control device as claimed in claim 6, wherein the spacing between consecutive absorbing parts increases outwardly from said optical axis of said optical path of said light reflected from said beam splitter.

* * * * *